US008850351B2

(12) United States Patent
Beharie et al.

(10) Patent No.: US 8,850,351 B2
(45) Date of Patent: Sep. 30, 2014

(54) METHOD AND TOOL FOR VIRTUAL DESKTOP MANAGEMENT

(75) Inventors: Zak Beharie, Richmond Hill (CA); Jason Smith, North York (CA)

(73) Assignee: ATI Technologies ULC, Markham, Ontario (CA)

(*) Notice: Subject to any disclaimer, the term of this patent is extended or adjusted under 35 U.S.C. 154(b) by 549 days.

(21) Appl. No.: 11/860,973

(22) Filed: Sep. 25, 2007

(65) Prior Publication Data

US 2009/0083655 A1    Mar. 26, 2009

(51) Int. Cl.
*G06F 3/048*    (2013.01)
*G06F 3/0486*    (2013.01)
*G06F 3/0481*    (2013.01)
*G06F 9/44*    (2006.01)

(52) U.S. Cl.
CPC ............ *G06F 9/4443* (2013.01); *G06F 3/0486* (2013.01); *G06F 3/0481* (2013.01)
USPC ............................. 715/778; 715/779; 715/788

(58) Field of Classification Search
CPC .................... G06F 3/0481; G06F 2203/04803; G06F 3/0486; G06F 9/4443
USPC .......................... 715/778, 775, 782, 779, 788
See application file for complete search history.

(56) References Cited

U.S. PATENT DOCUMENTS

| | | | | |
|---|---|---|---|---|
| 5,499,334 | A * | 3/1996 | Staab | 715/778 |
| 5,564,002 | A * | 10/1996 | Brown | 715/778 |
| 5,742,285 | A * | 4/1998 | Ueda | 715/778 |
| 5,841,435 | A * | 11/1998 | Dauerer et al. | 715/775 |
| 6,204,847 | B1 * | 3/2001 | Wright | 715/804 |
| 6,628,309 | B1 * | 9/2003 | Dodson et al. | 715/769 |
| 6,630,943 | B1 * | 10/2003 | Nason et al. | 715/746 |
| 6,710,788 | B1 * | 3/2004 | Freach et al. | 715/778 |
| 6,710,790 | B1 * | 3/2004 | Fagioli | 715/802 |
| 6,966,036 | B2 * | 11/2005 | Nason et al. | 715/778 |
| 7,010,755 | B2 * | 3/2006 | Anderson et al. | 715/778 |
| 7,051,111 | B1 * | 5/2006 | Scullin | 709/232 |
| 7,103,841 | B2 * | 9/2006 | Ronkainen et al. | 715/727 |
| 7,478,339 | B2 * | 1/2009 | Pettiross et al. | 715/779 |
| 7,665,033 | B2 * | 2/2010 | Byrne et al. | 715/782 |
| 8,136,047 | B2 * | 3/2012 | Holecek et al. | 715/788 |
| 2003/0189597 | A1 * | 10/2003 | Anderson et al. | 345/778 |
| 2005/0125739 | A1 * | 6/2005 | Thompson et al. | 715/778 |

(Continued)

OTHER PUBLICATIONS

Meredith Ringel, When One Isn't Enough: an Analysis of Virtual Desktop Usage Strategies and Their Implications for Design, Short Talks: Specialized Section Chi 2003: New Horizons pg. 762-763.*

*Primary Examiner* — Omar Abdul-Ali
*Assistant Examiner* — Andrew Tank
(74) *Attorney, Agent, or Firm* — Faegre Baker Daniels LLP

(57) ABSTRACT

A method for providing a desktop management tool includes displaying an active desktop having at least one application window representing an active application; storing data representing a virtual desktop in memory; while displaying the active desktop, receiving non-menu-based user input representing an application-move operation between the active desktop and the virtual desktop; and associating the active application with the virtual desktop. The method may also include displaying, as part of the active desktop, a visual representation of the virtual desktop. Other examples of the described method also include displaying an enlarged view of the contents of a virtual desktop in response to additional user input. An example apparatus for implementing the described methods is also described.

14 Claims, 7 Drawing Sheets

(56) References Cited

U.S. PATENT DOCUMENTS

| | | | |
|---|---|---|---|
| 2005/0132299 A1* | 6/2005 | Jones et al. | 715/759 |
| 2005/0268246 A1* | 12/2005 | Keohane et al. | 715/778 |
| 2006/0085760 A1* | 4/2006 | Anderson et al. | 715/778 |
| 2006/0136828 A1* | 6/2006 | Asano | 715/733 |

\* cited by examiner

METHOD AND TOOL FOR VIRTUAL DESKTOP MANAGEMENT

FIELD OF THE INVENTION

The disclosure generally relates to managing applications in a desktop environment and more particularly managing virtual desktops.

BACKGROUND OF THE INVENTION

As computers become more powerful and software applications are developed to help accomplish more and more tasks, computer users become more dependent on computers to accomplish tasks. As this use increases, computer users often find themselves using multiple software applications simultaneously. For example, increases in memory and processing power allow a computer user to have multiple applications open, which may include, for example, several word processing documents and multiple web browsers, along with other programs, such as graphic programs, gaming applications, and many other software applications. Simultaneously having several computer applications open can have advantages. For example, a user may switch between one or more applications without having to wait for an application to load. However, when a computer user has several software applications open, it may become difficult for the computer user to switch between a multitude of applications without some type of organization.

One solution to help solve problems associated with having many software applications running involves the concept of virtual desktops. Virtual desktops are contrasted with an active desktop. An active desktop is what is presented to a user on a physical hardware display (e.g., a monitor, LCD display, television screen, etc.). An active desktop may contain, for example, a background image, icons representing shortcuts to programs and/or files, and one or more application windows (in which a user may interact with or view information associated with an application). In contrast, a virtual desktop is not usually currently displayed but includes information, often in memory, that represents icons, background images, applications, application windows, the position of application windows, and other characteristics as known in the art. Thus, as known in the art, a user may cause a present active desktop to be stored in memory as a virtual desktop and activate a virtual desktop as the active desktop by using the information associated with the virtual desktop. As such, a computer user may have access to virtual desktops to help sort various software applications. It is further noted that both active and virtual desktops may span one or more physical display, i.e., they dot have to be limited to only one physical display.

For example, a computer user may have several word processing documents open on the active desktop. The computer user may also have several web browser application windows associated with a first virtual desktop. The computer user may also have communication applications, such as email and instant messaging programs, associated with a second virtual desktop. Thus, the computer user is able to organize the various open software applications on several desktops, thereby making it easier to find and interact with software applications. In this example, if the user wants to use a communication application, he or she may activate the second virtual desktop as the active desktop, and the previously active desktop having the word processing documents would then be represented in memory as a virtual desktop.

As virtual desktops became available, different techniques evolved that relate to managing virtual desktops and the characteristics (including applications, windows, window positions, background images, etc.) associated therewith. Managing virtual desktops includes, for example, moving an active (running) application from an active desktop to a virtual desktop (i.e., the application is still running, but the application window is logically removed or "hidden" from the active desktop thus no longer being physically displayed and information representing the application window and its positioning is associated with a virtual desktop), moving icons from an active desktop to a virtual desktop, and other similar tasks.

As known in the art, an active/running application may have an application window. The application window is a window that the application uses to present information to a user and/or to receive user input from a user. As also known, an application window may have various components, such as a title bar (to display information such as the application name or document open within the application), control buttons (such as buttons to minimize, maximize, or close the application), and borders (often used to resize an application window). An active application, however, does not necessarily require an application window. For example, some applications run in the background, i.e., they do not have an application window and run in a state where a user does not generally see the application running. (Although it is recognized that most operating systems provide a method for a user, often a more advanced user, to see a list of all running applications, even those running as a background process.)

In some implementations of virtual desktop systems, virtual desktop software hides a software application window that is usually shown to a user. Meanwhile, the application continues to run in the background and information associated with the software application and its application window is stored in memory and associated with a virtual desktop. Thus, in this example, moving an application to a virtual desktop may involve (1) hiding the application window from the active desktop (this may involve, for example, removing the application from the taskbar or system tray), (2) allowing the application to continue to run in the background (i.e., the application is not actually closed), and (3) updating memory associated with a virtual desktop to specify that the application is now associated with that particular virtual desktop and, perhaps, to further specify the window position of the application's application window. Thus, if the user switches to the virtual desktop (i.e., uses the data representing a virtual desktop to make the virtual desktop the active desktop), the virtual desktop software may unhide the application window.

Various solutions are known to accomplish some of the virtual desktop management tasks. For example, one solution to move an active application on the active desktop to a virtual desktop is for a user to right-click (i.e., click the right mouse button of a mouse, as known in the art) on the title bar of an application window. This action will display a menu containing a list of options for the user. For example, the menu may contain standard tasks such as "Close," "Minimize," or "Maximize." The menu may also contain options that relate to virtual desktop management tasks. For example, the menu may contain options such as "Move to Virtual Desktop 1," "Move to Virtual Desktop 2," etc. Thus, if a user right-clicks on the title bar of an application window (in the active desktop) and selects "Move to Virtual Desktop 1," the virtual desktop software will hide the application window and update memory to associate the application with Virtual Desktop 1, i.e., the user has moved the application from the active desktop to a virtual desktop designated "Virtual Desktop 1."

Many virtual desktop management solutions hide the active desktop in order to display some representation of the virtual desktops. For example, one solution involves pressing one or more function keys, which, when pressed, cause the display to display images representing one or more other virtual desktops. Thus, a user may move an application from one virtual desktop to another. In this solution, however, the active desktop is no longer displayed concurrently with the representations of the virtual desktops. Other known solutions do allow a user to view the active desktop at the same time as viewing visual representations of virtual desktops. In either case, however, the known solutions do not allow a user to move an application directly from the active desktop to a virtual desktop. For example, a user may be able to move an application from a visual representation of the active desktop to a visual representation of a virtual desktop, but the user may not move the application directly from the active desktop to a virtual desktop. It is also not known to move the an application from a visual representation of a virtual desktop directly to the active desktop without having to move the application from the virtual desktop to a representation of the active desktop, not the desktop itself. Other variations of this solution have been implemented that are more graphic intensive in the presentation of the virtual desktops. For example, in a similar solution, a rotatable cube is displayed when a user presses the proper function key(s), wherein each side of the cube represents a different virtual desktop. A user may then give user input, such as by moving a mouse or pressing a key, to rotate the cube, thereby showing the contents of different virtual desktops.

In yet another solution, a floating application window or a sidebar on the active desktop contains visual representations of each virtual desktop. A user may move applications between the different virtual desktops using this solution, but the user is unable to move an application from the active desktop to a virtual desktop.

While many solutions exist that relate to the management of virtual desktops, the known solutions are not without their problems. For example, many solutions do not allow a user to view virtual desktops at the same time as viewing the active desktop. Additionally, the known solutions often require menu-based input, which is not always intuitive to the user. Furthermore, using menu-based input to perform virtual desktop management operations can be time intensive. Therefore, a need exists to have a virtual desktop management solution that, among other things, is more user intuitive, more user friendly, and more efficient.

BRIEF DESCRIPTION OF THE DRAWINGS

The invention will be more readily understood in view of the following description when accompanied by the below figures and wherein like reference numerals represent like elements, wherein.

DETAILED DESCRIPTION OF THE PREFERRED EMBODIMENTS

Briefly, a method for providing a desktop management tool includes displaying an active desktop having at least one application window representing an active application; storing data representing a virtual desktop in memory; while displaying the active desktop, receiving non-menu-based user input representing an application-move operation between the active desktop (not a representation of an active desktop) and the virtual desktop; and associating the active application with the virtual desktop.

In another example, the method may also include displaying, as part of the active desktop, a visual representation of the virtual desktop.

In another example, the method may include receiving additional user input and displaying an enlarged view of the contents of the virtual desktop in response to the additional user input.

In yet another example, a method includes displaying an active desktop having an application window representing an active application; displaying, as part of the active desktop, a visual representation of a virtual desktop; based on received non-menu-based user input, removing the application window representing the active application from the active desktop; and updating the visual representation of the virtual desktop with an indication indicating the active application is associated with the virtual desktop.

In another example, the method includes removing the indication indicating the active application is associated with the virtual desktop from the visual representation of the virtual desktop and displaying the application window representing the active application on the active desktop.

An example device for implementing the described methods is also described.

Among other advantages, the described apparatus and methods allow a user to more effectively manage a multi-desktop environment, such as an environment having one or more virtual desktops. For example, the disclosed apparatus and methods allow a user to more intuitively and more efficiently perform desktop management operations, which, among other things, may allow the user to perform tasks in less time.

Figure 1:
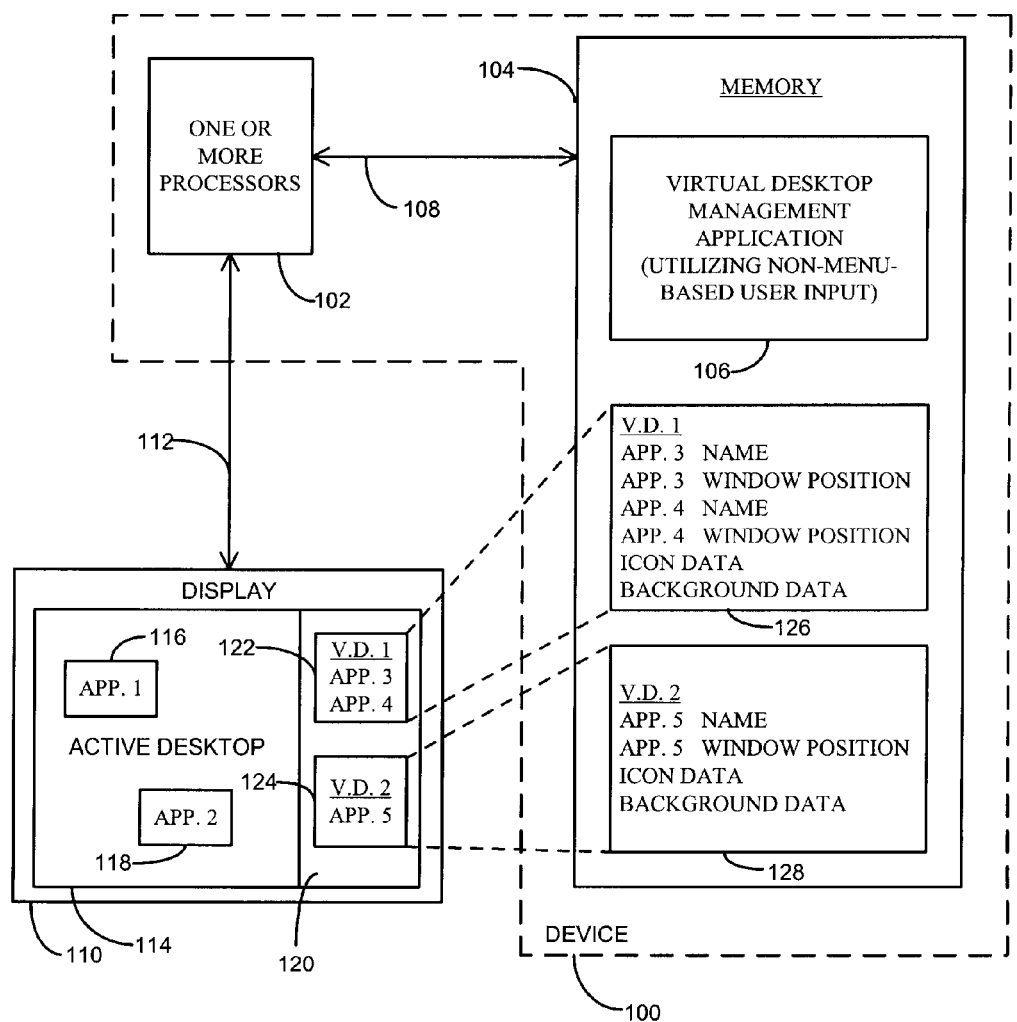
FIG. 1 is a block diagram illustrating one example of a device in accordance with one embodiment of the disclosure.

FIG. 1 shows a device 100, which may be, for example, a personal computer, a laptop computer, or any other suitable device. Although device 100 is shown as one system in FIG. 1, device 100 may be distributed. Device 100 may contain one or more processing devices 102 and memory 104, which contains stored computer readable instructions. The stored computer readable instructions are executable by the one or more processing devices 102.

One or more processing devices 102 may include one or more central processing units (CPUs), distributed processing circuitry, application specific integrate circuits (ASICs), state machines, discrete logic, or any other suitable processing circuitry known in the art. In device 100, the one or more processing devices 102, among other things, execute computer readable instructions stored in memory 104 such as the virtual desktop management application (utilizing non-menu-based user input) 106. The one or more processing devices 102 may retrieve or send the computer readable instructions or other data in memory as memory data 108 to memory 104. The one or more processing devices 102 may also be operatively connected to display 110 and send and receive display data 112 to and from display 110. As shown, display 110 may also include an active desktop 114, which is discussed in more detail below.

Memory 104 may be any type of memory conventionally known in the art, such as random access memory (RAM), read-only memory (ROM), programmable memory (PROM), erasable PROMs (EPROM), electrically erasable PROM (EEPROM), flash memory, magnetic storage devices (e.g., hard disks, floppy disks, magnetic tape), optical disc drives, or any other suitable non-volatile memory now known or later developed. It is further recognized that memory 104 and/or the one or more processing devices 102 may be distributed.

Also shown in FIG. 1 is an active desktop 114 on display 110. An active desktop 114 is most often viewable on display 110 (although an active desktop may be scrollable so that only a portion of the active desktop is viewable, thereby allowing a larger active desktop than a display may actually display). Active desktop 114 is the graphical interface through which one or more processing devices 102 presents information and otherwise interacts with a user. An active desktop often contains characteristics such as a background image, icons, application windows representing associated with running applications, sidebars, and other features known in the art. Active desktop 114 in FIG. 1 contains application window 116 and application window 118. Application window 116 is associated with an application named "App. 1," and application window 118 is associated with an application named "App. 2."

Active desktop 114 also contains a sidebar 120, which may also be an application or may be integrated into the active desktop. Instead of a sidebar, it is also recognized that a floating window may be used. Sidebar 120 contains visual representations of virtual desktops 122, 124. Visual representations of virtual desktops 122, 124 may be any suitable representation of a virtual desktop. For example, they could be a simple icon with a label. The visual representations 122, 124, however, may include additional information in various forms that corresponds to each particular virtual desktop. For example, the visual representation 122, 124 may be a screen shot of the virtual desktop or may be drawn based on data representing a virtual desktop 126, 128 stored in memory 104. In such cases, the visual representation 122, 124 may be a shrunken image of the actual virtual desktop as it would appear if activated as the active desktop 114. Alternatively, and as shown in FIG. 1, the visual representation of virtual desktops 122, 124 may show a subset of characteristics associated with a virtual desktop. For example, visual representations of virtual desktops 122, 124 in FIG. 1 contain only a list of applications that are associated with each virtual desktop. In FIG. 1, visual representation of a virtual desktop 122 is a visual representation of a first virtual desktop, named "V.D. 1," which contains two applications: "App. 3" and "App. 4." Visual representation of a virtual desktop 124 is a visual representation of a second virtual desktop named "V.D. 2," which contains an application named "App. 5."

As shown by the dotted lines in FIG. 1, each visual representation of a virtual desktop 122, 124 maps to data representing a virtual desktop 126, 128 in memory 104, which is information representative of each virtual desktop. Data representing a virtual desktop 126, 128 contains any data necessary for maintaining a virtual desktop, i.e., data representing a virtual desktop 126, 128 is used to change the active desktop if a user activates a virtual desktop as the active desktop. Thus, for example, data representing a virtual desktop 126, 128 may include information such as the names of any applications associated with each the virtual desktop, window position information for each application window associated with each application that is associated with each virtual desktop, icon data representing what icons, if any, are displayed on each virtual desktop, and background data, which may indicate, for example, a background image and/or color that is associated with each virtual desktop. For example, data representing a virtual desktop 126 is associated with a virtual desktop named "V.D. 1." Data representing a virtual desktop 126 includes App. 3 Name (the name of an application), the window position of App. 3, App. 4 Name (the name of another application), the window position of App. 4, icon data, and background data. Data representing a virtual desktop 128 includes App. 5 Name (the name of an application associated with the virtual desktop named "V.D. 2"), the window position of App. 5, icon data, and background data. It is understood, however, that data representing a virtual desktop 126, 128 may include any additional information associated with a virtual desktop, such as the status of application windows (e.g., maximized or minimized), the tile position of application windows (i.e., the depth of application windows in relation to the depth of other application windows), etc.

This disclosure is best understood by describing a method for providing a desktop management tool, which may be implemented by a device 100. It is understood, however, that the method disclosed herein is not limited to device 100 and may be implemented by any suitable method. Furthermore, FIGS. 2-6 illustrate display 110 showing various examples of active desktop 114. It is understood that these examples are given to help illustrate the principles disclosed within. Thus, they may not be to scale, and in practice, they may include additional features not depicted within. Furthermore, although different features may be illustrated in and described in relation to different figures, some of the principles disclosed herewith in one figure may be applied along with features shown in other different figures, as will be appreciated by one of ordinary skill in the art. The steps of methods disclosed within may be performed in any suitable order and may further include steps before, after, or between the disclosed steps.

Figure 6:
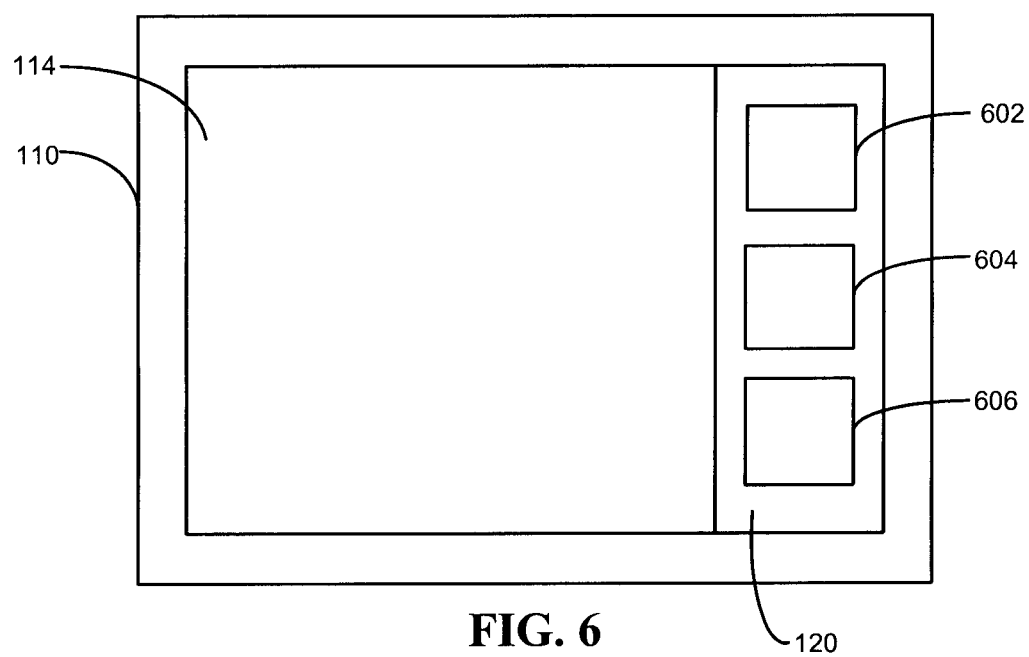
FIG. 6 is one example of an active desktop on a display in accordance with one embodiment of the disclosure.
Figure 7:
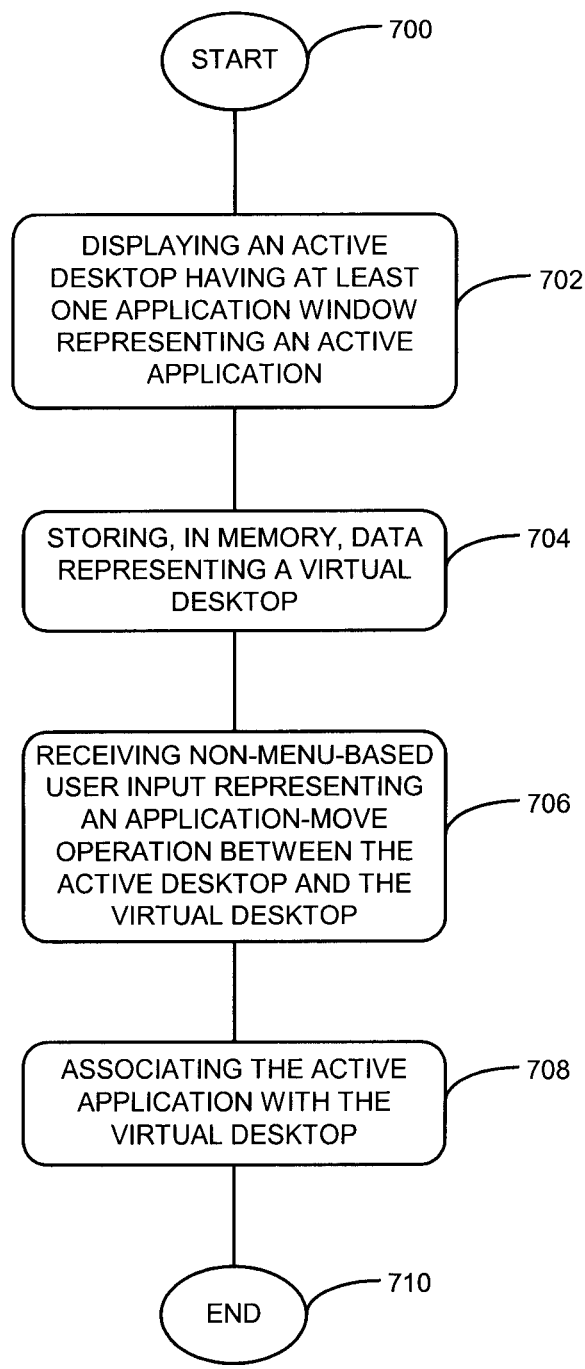
FIG. 7 is a flowchart illustrating one example of a method for providing a desktop management tool in accordance with one embodiment of the disclosure.

Turning now to FIG. 7 (as discussed with FIGS. 2-6), a method for providing a desktop management tool begins in block 700. As shown in block 702, the method includes displaying (i.e., presenting to a display) an active desktop having at least one application window representing an active application. As shown in FIG. 1, active desktop 114 contains application window 116 and application window 118, wherein application window 116 represents an application named App. 1 and application window 118 represents an application named App. 2.

Next, as shown in block 704, the method includes storing, in memory, data representing a virtual desktop. As shown in FIG. 1, data representing a virtual desktop 126 represents virtual desktop V.D. 1, and data representing a virtual desktop 128 represents virtual desktop V.D. 2. The application window, as described above, allows an application to visually present information to a user and allows a user to input information into the application. The application window may further include features such as minimize, maximize, and close buttons; stretchable borders (to resize the window); a title bar, which may contain information such as the application name and/or a file name that is open within the application; and a status indicator, which may indicate if the application window is active, i.e., has focus, or whether the application window is inactive.

Figure 2:
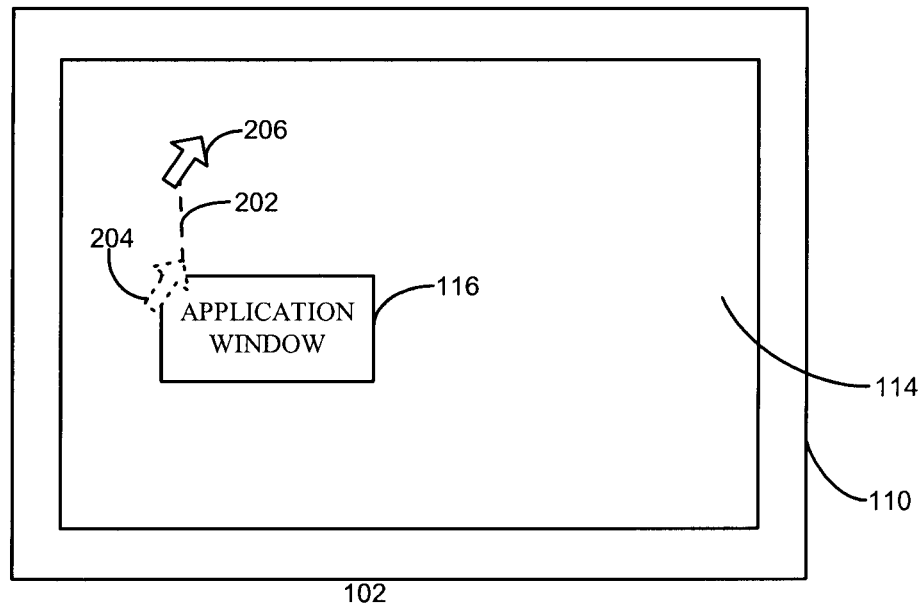
FIG. 2 is one example of an active desktop on a display in accordance with one embodiment of the disclosure.

As shown in block 706, the method includes receiving non-menu-based user input representing an active application-move operation between the active desktop (not a representation of an active desktop) and the virtual desktop. This preferably occurs while still displaying the active desktop. Non-menu-based user input may take any suitable form that does not include a menu, such as a determined cursor direction, a determined cursor path, a determined cursor distance, a determined cursor location, or a specific key combination. For example, non-menu-based user input may include pressing various keys on a keyboard and/or moving a mouse, perhaps in a particular pattern or to a particular screen location. For example, non-menu-based user input 202 is illustrated in FIG. 2 and is an example of non-menu-based user input in the form of a determined cursor direction. Dotted cursor 204 represents a starting cursor position, and solid cursor 206 represents the ending cursor position after the mouse is moved to input non-menu based user input 202. In this particular example, a user may click and hold a portion of the application window 116 (perhaps on the title bar (not shown)) while moving the mouse in an upward direction, as shown. Then the user may release the mouse. A virtual desktop management application 106 or any suitable application or circuit may detect the non-menu-based user input 202 and recognize it as representing an application-move operation. Other similar forms of non-menu-based user input not shown may include a similar mouse operation but in a different direction, such as left, right, down, or diagonally. As one skilled in the art will appreciate, the non-menu-based user input 202 may have various requirements to be recognized as an application-move operation. For example, the movement from the starting cursor position represented by dotted cursor 204 to the end position represented by the solid cursor 206 might have to be separated by at least a minimal distance (perhaps specified in pixels) or occur within a certain amount of time.

An application-move operation is a virtual desktop management task and, from a user's perspective, moves an application (and its associated application window) from the active desktop (not a representation of the active desktop) to a virtual desktop. Thus, as shown in block 708, the method also includes associating the active application with the virtual desktop. The method then ends as shown in block 710. As described above, this may involve hiding the application window while the application remains running and updating data representing a virtual desktop 126, 128. Furthermore, depending on the non-menu-based user input 202, the application-move operation may cause the active application to be associated with different virtual desktops. For example, if the non-menu-based user input is in an upward direction, the application may be associated with a first virtual desktop. One may view this as the user "throwing" the application to the first virtual desktop. Alternatively, if the non-menu-based user input is in a rightward direction, the application may be associated with a second virtual desktop. If the non-menu-based user input is in a leftward direction, the application may be associated with a third virtual desktop. The application-move operations may be user configurable so that the user may specify with which virtual desktop an application may become associated based on the various non-menu-based user inputs. Note that in this example, the user may drop the application to a virtual desktop without having to swap the current desktop to a virtual desktop. Instead of switching desktops, this "throwing" may be done in the current active desktop. This allows the user to "throw away" an application to another desktop and keep working on the current desktop without further user input.

Figure 3:
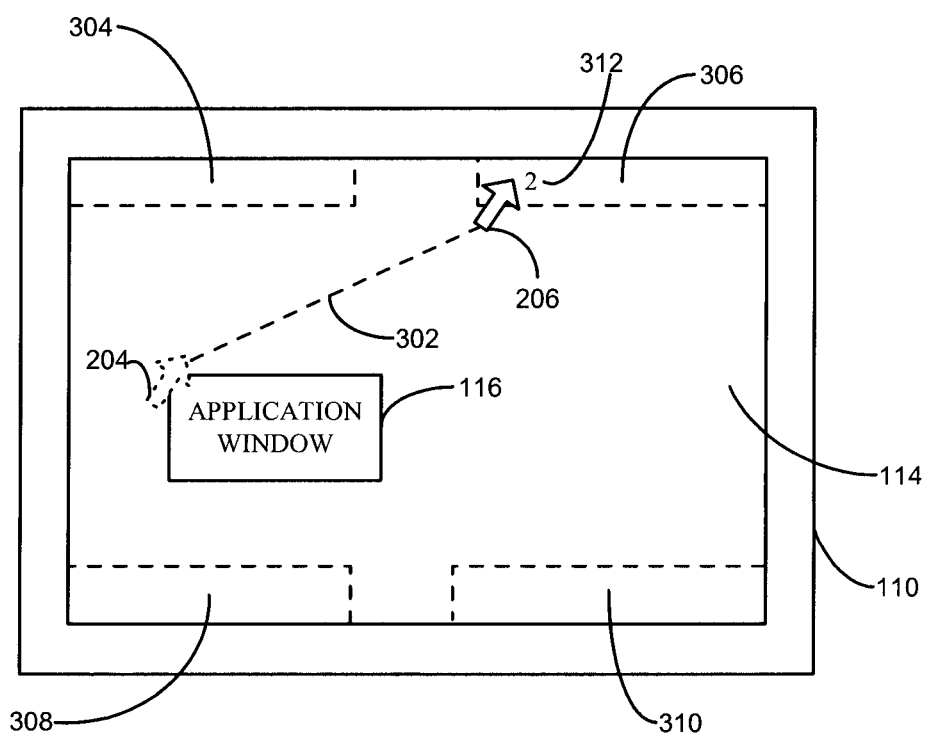
FIG. 3 is one example of an active desktop on a display in accordance with one embodiment of the disclosure.

Another example of non-menu-based user input is shown in FIG. 3. Again, dotted cursor 204 represents the starting position of the cursor and solid cursor 206 represents the ending position. Dotted line represents the path of movement 302, although in this particular example, the path of movement 302 is not relevant to the non-menu-based user input. Instead, active desktop 114 has four zones 304-310. If a user clicks and drags an application window to a particular zone, the determined cursor location (i.e., whether the cursor is located within one of the zones 304-310) is non-menu-based user input, which may represent an application-move operation. For example, if a user drags an application window 116 to zone 304, the application associated with that application window 116 may be associated with a first desktop. If the user drags application window 116 to zone 306, the application associated with application window 116 may become associated with a second virtual desktop. Furthermore, there may be some indication as to which virtual desktop the application-move operation is associated with. As shown in FIG. 3, for example, the cursor 206 includes a visual representation of an application-move operation 312 that further indicates that if the mouse is released in its current position in zone 306, the application will become associated with a second virtual desktop, as indicated by the numeral "2."

Figure 4:
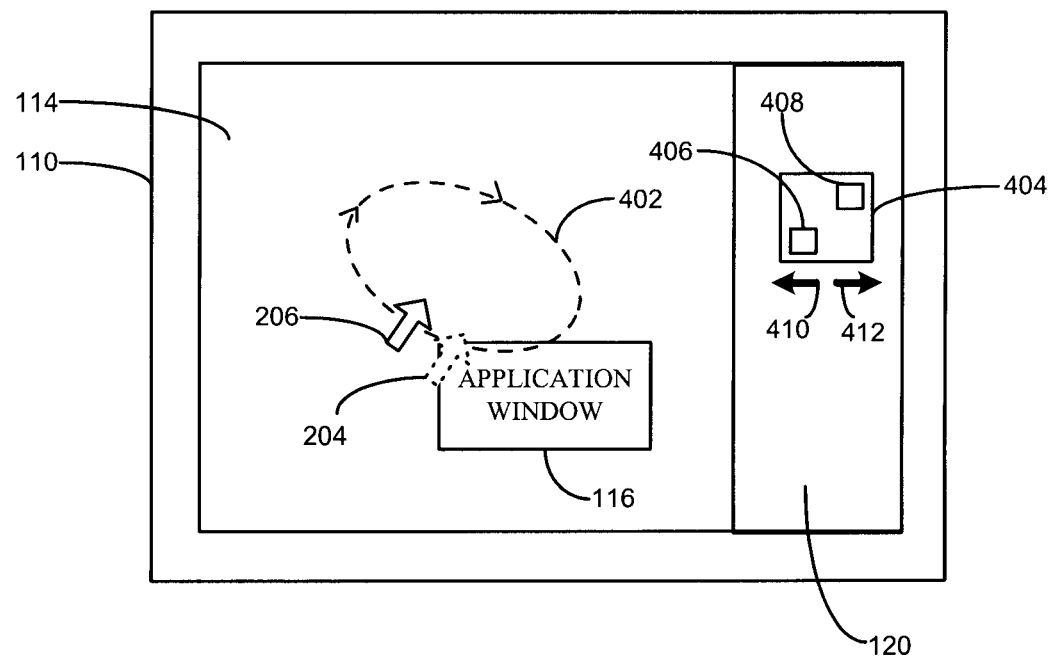
FIG. 4 is one example of an active desktop on a display in accordance with one embodiment of the disclosure.

Still another example of non-menu-based user input is shown in FIG. 4. In this example, non-menu-based user input 402 takes the form of a cursor path, as indicated by the dotted line. In this example, the non-menu-based user input is a clockwise circle, with the dotted cursor 204 representing the starting location of the cursor and the solid cursor 206 representing the end location of the cursor. Other examples of similar non-menu-based user input may include a cursor path that is in a counterclockwise direction or that forms a different shape, such as a square or triangle, instead of an ellipse. It is noted, however, that the cursor path need not be a shape. For example, it could be a path formed by an upward movement followed by a rightward movement.

Figure 8:
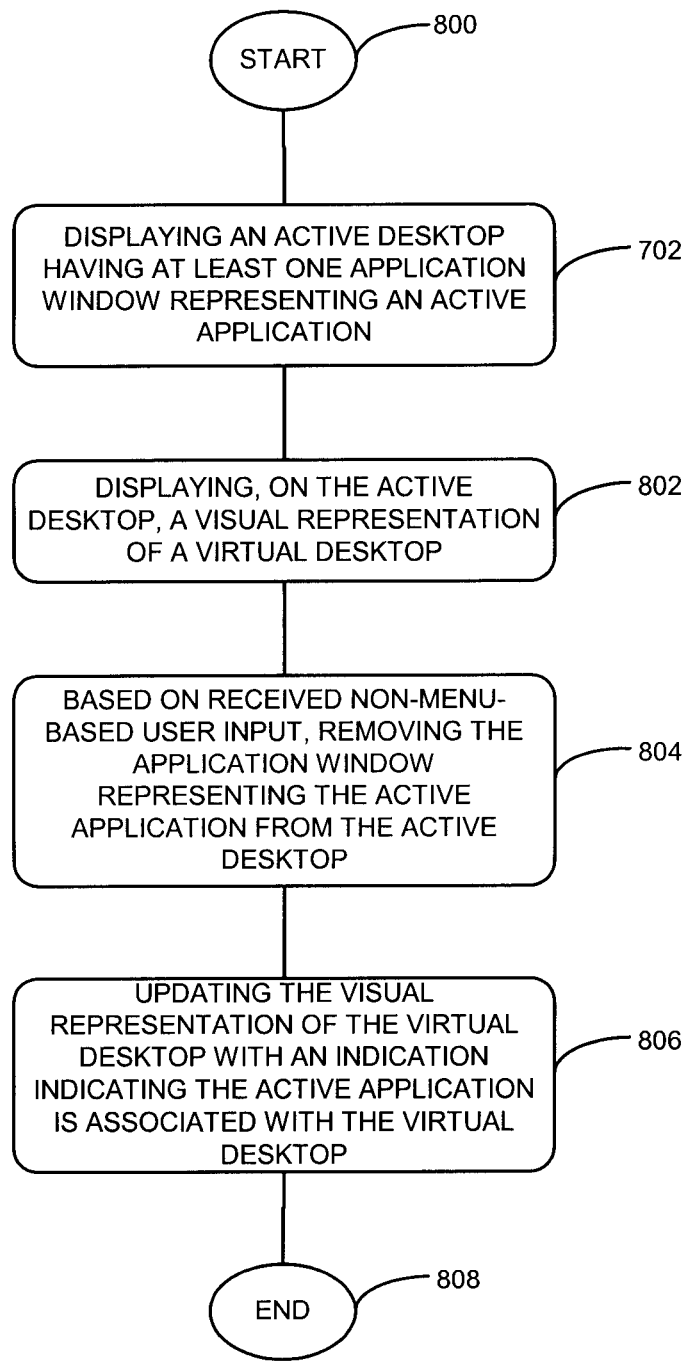
FIG. 8 is a flowchart illustrating one example of a method for providing a desktop management tool in accordance with one embodiment of the disclosure.

Another example method is shown in FIG. 8, which begins in block 800. This example method also includes displaying an active desktop having at least one application window representing an active application, as shown in block 702. Another step shown in block 802 includes presenting, on the active desktop, a visual representation of a virtual desktop. An example of this is shown in FIG. 4, wherein a visual representation of a virtual desktop 404 is shown on sidebar 120. Although shown on sidebar 120, the visual representation of a virtual desktop 404 could be in any suitable location, such as in an application window or embedded into the active desktop, as is discussed above in relation to visual representations of virtual desktops 122, 124 shown in FIG. 1. Visual representation of a virtual desktop 404 shows a visual representation of a virtual desktop that has two application windows 406, 408.

It is also noted that another form of non-menu-based user input representing an application-move operation, as described above, could take the form of dragging an application window 116 from the active desktop over the visual representation of a virtual desktop 404, which could then cause the application associated with application window 116 to be associated with the virtual desktop represented by the visual representation of the virtual desktop 404.

Furthermore, based on additional received non-menu-based user input, an indication indicating the active application is associated with the virtual desktop may be removed from the visual representation of the virtual desktop 404. For example, application window 406 or 408 is an indication indicating different applications are associated with the virtual desktop. As noted above, however, these indications could be a list of applications, for example, and may not take the form of a shrunken, actual representation of the virtual desktop. In this example, a user may drag (or otherwise provide non-menu-based user input) application window 406 or 408 from the visual representation of the virtual desktop 404 to active desktop 114. Based on this non-menu-based user input, application window 406 or 408 may be removed from the visual representation of the virtual desktop 404, and the application window may then be displayed on the active desktop 114, which represents the active application on the active desktop.

It is further noted that FIG. 4 contains scroll buttons 410 and 412 beneath the visual representation of the virtual desktop 404. These buttons may be used to change the visual representation of a virtual desktop 404 to a visual representation of a different virtual desktop. Thus, a user may "toggle" or "flip through" different virtual desktops. Alternatively, as shown in FIG. 6, sidebar 120 may contain several visual representations of virtual desktops 602-606. This plurality of visual representations of virtual desktops 602-606 may be representations of all virtual desktops or may be a subset of the available virtual desktops.

Turning back to FIG. 8 and as shown in block 804, the method also includes, based on received non-menu-based user input, removing the application window representing the active application from the active desktop. Then, as shown in block 806 before the method ends in block 808, the method includes updating the visual representation of the virtual desktop with an indication indicating the active application is associated with the virtual desktop. Thus, for example, the visual representation of a virtual desktop 404 may be redrawn to show not only application windows 406 and 408 but to also show application window 116 (or a representation thereof). Furthermore, a user may be able to interact with a visual representation of a virtual desktop 404 and the features thereof. For example, a user may be able to move application windows 406, 408 within the visual representation of the virtual desktop 404 or may be able to resize windows. Any such changes could cause the data representing a virtual desktop 126, 128 to be updated so that activating a virtual desktop will reflect the changes made via the visual representation of the virtual desktop 404.

Figure 9:
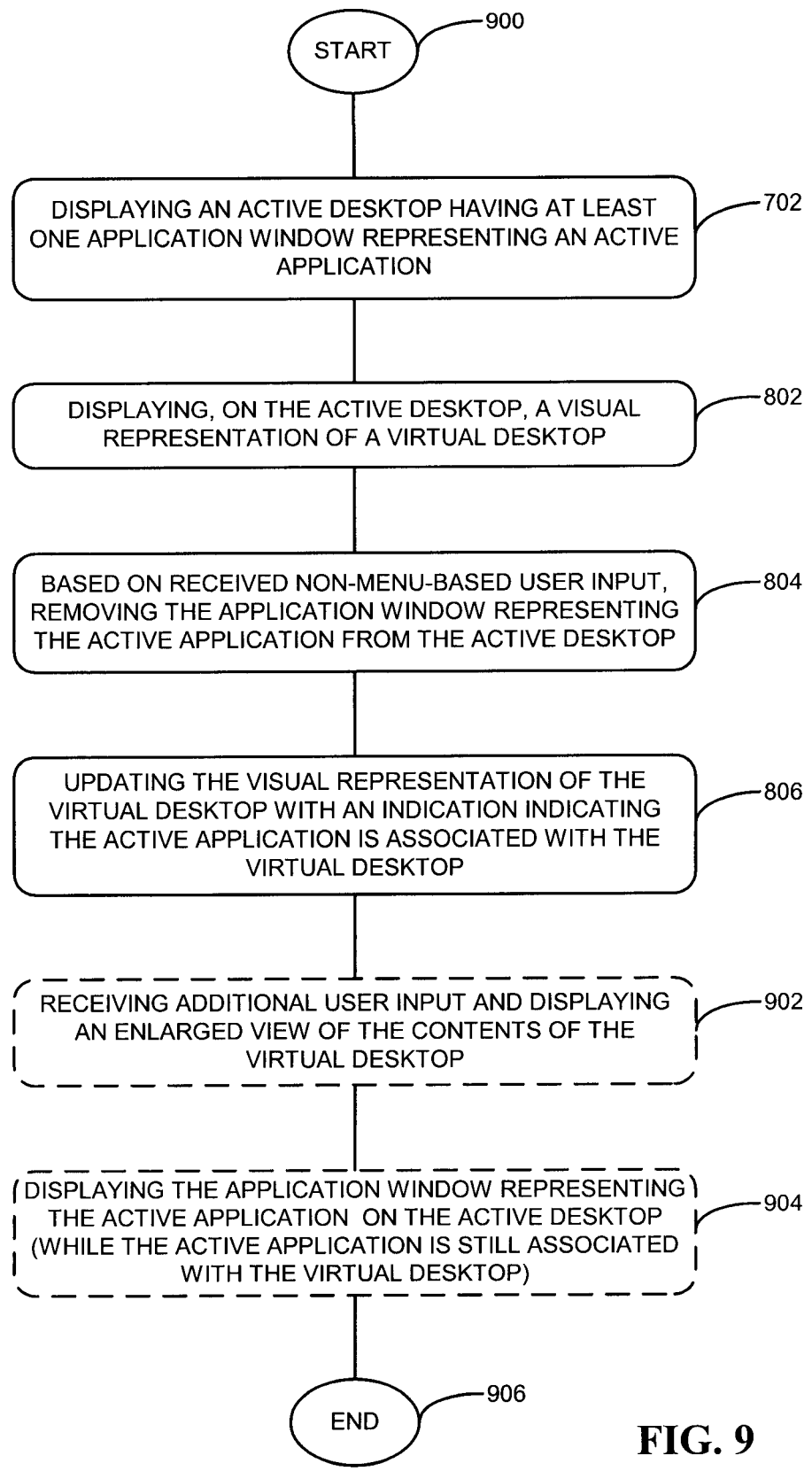
FIG. 9 is a flowchart illustrating one example of a method for providing a desktop management tool in accordance with one embodiment of the disclosure.

FIG. 9 shown another method beginning in block 900 and ending in block 906. This example method, similar to that shown in FIG. 8, also includes blocks 702 and 802-806. The method shown in FIG. 9, however, also includes the steps shown in blocks 902 and 904, which are shown in dotted lines to indicate that the two may happen dependent from each other. Thus, for example, the step shown in block 902 is not necessary for the step shown in block 904, yet both may occur together.

As shown in block 902, the method may include receiving additional user input and presenting an enlarged view of the contents of the virtual desktop. This additional user input may or may not be non-menu-based user input. For example, the additional user input could include a key stroke (or combination of key strokes), menu-based user input (e.g., right-click, select "zoom" from menu), non-menu-based user input (e.g., scroll wheel, click and drag, etc.), or any other suitable form of user input. By presenting an enlarged view of the contents of the virtual desktop, a user can more easily see the contents of the virtual desktop, such as which applications are associated with the application windows. This may be particularly useful if the virtual desktop contains a large number of application windows.

Figure 5:
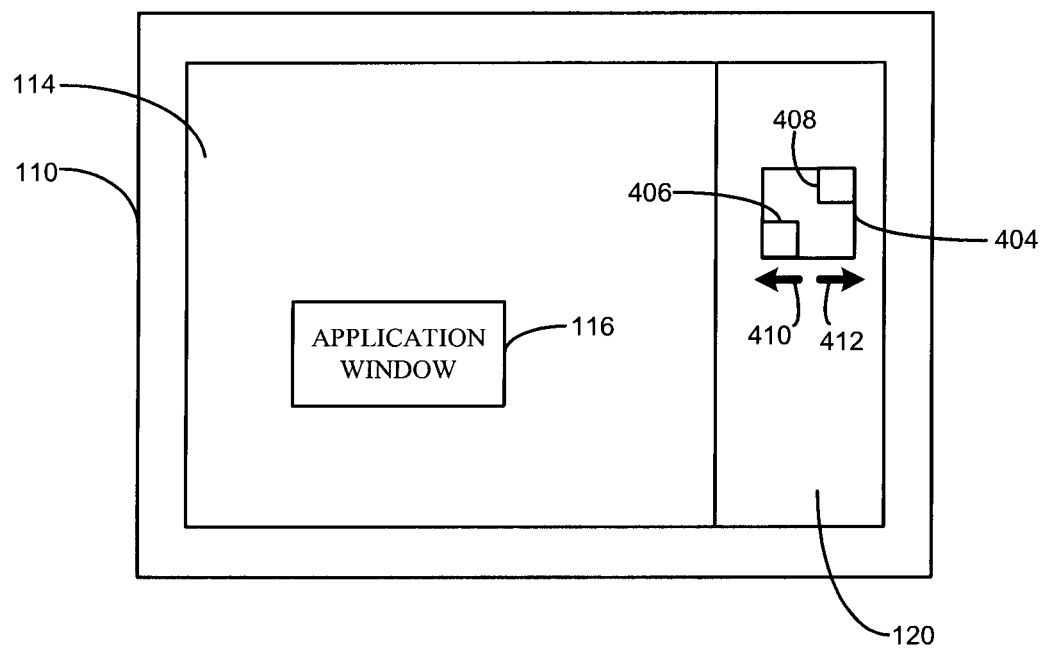
FIG. 5 is one example of an active desktop on a display in accordance with one embodiment of the disclosure.

The enlarged view of contents of the virtual desktop may be displayed by keeping a viewed size of the virtual desktop constant, i.e., the visual representation of the virtual desktop 404 will not change size, but instead, only a portion of the entire virtual desktop will appear in the representation. This is illustrated, for example, by comparing the visual representation of the virtual desktop 404 in FIGS. 4 and 5. The visual representation of the virtual desktop 404 shown in FIG. 4 shows the entire virtual desktop having application windows 406 and 408. In FIG. 5, however, visual representation of the virtual desktop 404 shows an enlarged view of the contents of the virtual desktop. Note, for example, that application windows 406 and 408 are larger, yet they are now displayed at the edges of the visual representation of the virtual desktop 404. It is also conceived, however, that displaying the enlarged view of the contents of the virtual desktop does not require that the viewed size of the virtual desktop remain constant. Thus, for example, the viewed size of the visual representation of the virtual desktop 404 could become larger, thereby allowing an enlarged (or magnified) view of the contents of the virtual desktop while still allowing all of the contents of the virtual desktop to be displayed. When presenting an enlarged view of the contents of the virtual desktop in a visual representation of the virtual desktop 404, i.e., when a user "zooms in," it is also noted a user may "pan." When the entire visual representation of the virtual desktop 404 does not allow a user to view the entire desktop, perhaps because the user is zoomed into the visual representation to present an enlarge/magnified view, panning allows the user to move the visual representation, such as up, down, left, or right, of the virtual desktop 404 such that the user may view portions of the virtual desktop not initially viewable. It is understood that panning may be performed by receiving any suitable user input, such as menu-based user input or non-menu-based user input.

As shown in block 904, the method may also include, based on additional user input, displaying the application window representing an active application on the active desktop. Thus, for example, this functionality may allow a user to temporarily bring an application to the active desktop, while still leaving it associated with a virtual desktop, so that the user may interact with the application. For example, a user may wish to temporarily have an application associated with another virtual desktop available on the active desktop to view information, cut information, copy information, paste information, input data, or perform a function within the application. As one example of performing a function within an application, if the application is a music player, a user may wish to temporarily bring the music player application to the active desktop to go to the next track. Note that the visual representation of the virtual desktop 404, in one example, will still display the indication (e.g., application window 406, 408) when the application window representing the active application is displayed on the active desktop.

When an application window representing an active application is displayed on the active desktop 114, the application window representing the active application may be removed from the active desktop. This removal could be based on additional user input (a key stroke, menu-based user input, or non-menu-based user input). Alternatively, the removal of the application window could be based on other factors, such as time. For example, an application window that is temporarily brought to the active desktop could remain on the active desktop for a set amount of time. Other variations will be recognized by one of ordinary skill in the art.

Although this disclosure presents various examples, it is understood that the elements from the various examples may be used alone or in combination as will be appreciated by one having ordinary skill in the art. It is further understood that other variations are still within the scope and spirit of this disclosure. For example, placing a mouse over a visual representation of a virtual desktop may allow pop-up bubbles or images to show (via a text label or enlarged view) the particular part of the visual representation of the virtual desktop that is hovered over. Another example of a potential variation within the scope of the discloser may include double clicking an application window within a visual representation of a virtual desktop to perform a function, such as to temporarily bring the application window to the active desktop or to close the application. Furthermore, the example wherein an enlarged view of the contents of a visual representation of a virtual desktop is displayed may include presets, such as 10×, 20×, or 50× magnification. It is also recognized that many of the features disclosed may be highly user configurable. For example, a user may configure where or how an application window is placed on a virtual desktop when a user gives non-menu-based user input associated with a an application-move operation. As another example, a device for providing a desktop management tool may include one or more processing devices operative to execute stored computer readable instructions and memory containing stored computer readable instructions executable by the one or more processing devices that, when executed by the one or more processing devices, cause the one or more processing devices to output data, such as display data 112, for displaying an active desktop having at least one application window representing an active application. This display data 112 may be used to display the active desktop, may be stored in memory (such as a frame buffer), or it may be used for further processing by the one or more processing devices.

Thus, among other advantages, users may more intuitively interact with virtual desktops and applications associated therewith. Not only may the interaction be more intuitive, it may also be more efficient, which may, among other things, allow a user to perform virtual desktop management operations in a faster manner.

The above detailed description of the disclosure and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein.

What is claimed is:

1. A method for providing a desktop management tool comprising:
   displaying an actual active desktop having at least one application window representing an active application;
   storing, in memory, data representing a virtual desktop;
   while displaying the actual active desktop, receiving non-menu-based user input representing an application-move operation of the displayed application window representing the active application between the actual active desktop and the virtual desktop;
   associating the active application with the virtual desktop based on the received non-menu -based user input representing an application-move operation, without switching the actual active desktop to the virtual desktop;
   displaying, as part of the actual active desktop, a visual representation of the virtual desktop;
   receiving additional user input;
   displaying, as part of the actual active desktop, an enlarged view of the contents of the virtual desktop in response to the additional user input
   wherein the displaying of the enlarged view of the contents of the virtual desktop keeps a viewed size of the virtual desktop constant;
   receiving another user input representing a pan operation of the visual representation of the virtual desktop; and
   panning the visual representation of the virtual desktop based on the another user input.

2. The method of claim 1 wherein the another user input includes at least one non-menu-based user input.

3. The method of claim 1 wherein the non-menu-based user input includes at least one of: a determined cursor direction, a determined cursor path, a determined cursor distance; and a determined cursor location.

4. A method for providing a desktop management tool comprising:
   displaying an actual active desktop having an application window representing an active application;
   displaying, as part of the actual active desktop, a visual representation of a virtual desktop;
   based on received non-menu-based user input representing an application-move operation between the actual active desktop and the virtual desktop, removing the application window representing the active application from the actual active desktop;
   updating, but without switching the actual active desktop to the virtual desktop, the visual representation of the virtual desktop with an indication indicating the active application is associated with the virtual desktop;
   receiving additional user input;
   displaying, as part of the actual active desktop, an enlarged view of the contents of the virtual desktop in response to the additional user input
   wherein the displaying of the enlarged view of the contents of the virtual desktop keeps a viewed size of the virtual desktop constant;
   receiving another user input representing a pan operation of the visual representation of the virtual desktop; and
   panning the visual representation of the virtual desktop based on the another user input.

5. The method of claim 4 further comprising:
   based on additional received non-menu-based user input, removing the indication indicating the active application is associated with the virtual desktop from the visual representation of the virtual desktop; and
   displaying the application window representing the active application on the actual active desktop.

6. The method of claim 4 further comprising, based on additional user input, displaying the application window representing the active application on the actual active desktop.

7. The method of claim 4 wherein the non-menu-based user input includes at least one of: a determined cursor direction, a determined cursor path, a determined cursor distance; and a determined cursor location.

8. A device for providing a desktop management tool comprising:
   one or more processing devices operative to execute stored computer readable instructions; and
   memory containing stored computer readable instructions executable by the one or more processing devices that, when executed by the one or more processing devices, cause the one or more processing devices to:

output data for displaying an actual active desktop having at least one application window representing an active application;

store, in memory, data representing a virtual desktop;

while outputting data for displaying the actual active desktop, receive non-menu-based user input representing an application-move operation of the displayed application window representing the active application between the actual active desktop and the virtual desktop;

associate the active application with the virtual desktop based on the received non-menu-based user input representing an application-move operation, without switching the actual active desktop to the virtual desktop;

display, as part of the actual active desktop, a visual representation of the virtual desktop;

receive additional user input; display, as part of the actual desktop, an enlarged view of the contents of the virtual desktop in response to the additional user input wherein the display of the enlarged view of the contents of the virtual desktop keeps a viewed size of the virtual desktop constant;

receive another user input representing a pan operation of the visual representation of the virtual desktop; and pan the visual representation of the virtual desktop based on the another user input.

9. The device of claim 8 wherein the another user input includes at least one non-menu-based user input.

10. The method of claim 8 wherein the non-menu-based user input includes at least one of: a determined cursor direction, a determined cursor path, a determined cursor distance; and a determined cursor location.

11. A device for providing a desktop management tool comprising:

one or more processing devices operative to execute stored computer readable instructions; and memory containing stored computer readable instructions executable by the one or more processing devices that, when executed by the one or more processing devices, cause the one or more processing devices to:

output data for displaying an actual active desktop having an application window representing an active application;

output data for displaying, as part of the actual active desktop, a visual representation of a virtual desktop;

based on received non-menu-based user input representing an application-move operation of the displayed application window representing the active application between the actual active desktop and the virtual desktop, remove the application window representing the active application from the actual active desktop, without switching the actual active desktop to the virtual desktop;

update the visual representation of the virtual desktop with an indication indicating the active application is associated with the virtual desktop;

receive additional user input;

display, as part of the actual active desktop, an enlarged view of the contents of the virtual desktop in response to the additional user input wherein the display of the enlarged view of the contents of the virtual desktop keeps a viewed size of the virtual desktop constant;

receive another user input representing a pan operation of the visual representation of the virtual desktop; and pan the visual representation of the virtual desktop based on the another user input.

12. The device of claim 11 wherein the computer readable instructions, when executed by the one or more processing devices, further cause the one or more processing devices to:

based on additional received non-menu-based user input, remove the indication indicating the active application is associated with the virtual desktop from the visual representation of the virtual desktop; and display the application window representing the active application on the actual active desktop.

13. The device of claim 11 wherein the computer readable instructions, when executed by the one or more processing devices, further cause the one or more processing devices to:

based on additional user input, display the application window representing the active application on the actual active desktop.

14. The device of claim 11 wherein the non-menu-based user input includes at least one of: a determined cursor direction, a determined cursor path, a determined cursor distance; and a determined cursor location.

* * * * *